United States Patent
Thomson et al.

(10) Patent No.: US 12,172,102 B2
(45) Date of Patent: Dec. 24, 2024

(54) APPARATUS AND METHOD FOR CONCENTRATING A FLUID

(71) Applicant: Pivotal Enterprises Pty Ltd, Brunswick (AU)

(72) Inventors: Christopher Thomson, Surrey Hills (AU); Stephen Fahry, Carlton North (AU); Georgios Mihos, Preston (AU); Paul Pallaghy, Ivanhoe (AU)

(73) Assignee: Pivotal Enterprises Pty Ltd, Brunswick (AU)

( * ) Notice: Subject to any disclaimer, the term of this patent is extended or adjusted under 35 U.S.C. 154(b) by 108 days.

(21) Appl. No.: 17/926,336

(22) PCT Filed: May 18, 2021

(86) PCT No.: PCT/AU2021/050462
§ 371 (c)(1),
(2) Date: Nov. 18, 2022

(87) PCT Pub. No.: WO2021/232093
PCT Pub. Date: Nov. 25, 2021

(65) Prior Publication Data
US 2023/0191276 A1    Jun. 22, 2023

(30) Foreign Application Priority Data
May 19, 2020  (AU) .............................. 2020901609

(51) Int. Cl.
*B01D 1/30*  (2006.01)
*B01D 1/00*  (2006.01)
(Continued)

(52) U.S. Cl.
CPC ............. *B01D 1/30* (2013.01); *B01D 1/0082* (2013.01); *B01D 1/14* (2013.01); *B01D 1/16* (2013.01);
(Continued)

(58) Field of Classification Search
CPC .......... B01D 1/0082; B01D 1/14; B01D 1/16; B01D 1/30; C02F 1/042; C02F 1/048; C02F 1/12; C13B 25/06
See application file for complete search history.

(56) References Cited

U.S. PATENT DOCUMENTS 5,215,704 A * 6/1993 Hirota ..................... F28F 19/00
                                                  376/245
5,466,294 A * 11/1995 Kearney ................. C13B 35/06
                                                  210/660
(Continued)

FOREIGN PATENT DOCUMENTS

| AU | 2014218482 A1 | 9/2014 |
| WO | 2016187601 A2 | 11/2016 |
| WO | 2020062710 A1 | 4/2020 |

OTHER PUBLICATIONS

International Search Report and Written Opinion for Related Application No. PCT/AU2021/050462 dated Jun. 25, 2021 (8 pages).
(Continued)

*Primary Examiner* — Jonathan Miller
(74) *Attorney, Agent, or Firm* — Michael Best & Friedrich LLP

(57) ABSTRACT

A method of concentrating a process fluid, including a carrier fluid, including: (a) maintaining a process fluid at a predetermined temperature value/range; (b) evaporating the carrier fluid from the process fluid to produce a concentrated process fluid; (c) monitoring at least one process variable of steps (a) or (b) to detect fouling formed in either step (a) or (b); and (d) initiating a cleaning protocol if the process variable deviates from a predetermined value/range to reduce the fouling formed.

20 Claims, 3 Drawing Sheets

(51) Int. Cl.
*B01D 1/14* (2006.01)
*B01D 1/16* (2006.01)
*C02F 1/04* (2023.01)
*C02F 1/12* (2023.01)
*C13B 25/06* (2011.01)

(52) U.S. Cl.
CPC .............. *C02F 1/042* (2013.01); *C02F 1/048* (2013.01); *C02F 1/12* (2013.01); *C13B 25/06* (2013.01); *C02F 2303/14* (2013.01); *C02F 2303/22* (2013.01)

(56) References Cited

U.S. PATENT DOCUMENTS

| | | | |
|---|---|---|---|
| 6,290,778 B1* | 9/2001 | Zugibe | F28G 7/00 134/1 |
| 7,424,999 B2* | 9/2008 | Xu | B01J 19/32 95/198 |
| 8,496,234 B1* | 7/2013 | Govindan | B01D 5/0051 261/157 |
| 9,266,747 B1* | 2/2016 | Sparrow | B01D 3/065 |
| 10,376,807 B2* | 8/2019 | Chang | C02F 1/041 |
| 10,513,445 B2* | 12/2019 | Govindan | B01D 5/006 |
| 10,537,828 B2* | 1/2020 | Baxter | B01D 1/305 |
| 10,829,389 B2* | 11/2020 | Shahsavar | B01D 1/16 |
| 10,981,082 B2* | 4/2021 | Govindan | C02F 1/04 |
| 11,624,566 B2* | 4/2023 | Hæggström | B08B 3/12 134/1 |
| 2014/0284002 A1* | 9/2014 | Sparrow | B01D 1/00 159/13.4 |
| 2015/0122631 A1* | 5/2015 | James | C02F 1/048 203/1 |
| 2015/0353377 A1* | 12/2015 | Al-Sulaiman | C02F 1/043 261/114.2 |
| 2016/0039683 A1* | 2/2016 | Sparrow | B01D 1/26 202/168 |
| 2016/0096741 A1* | 4/2016 | Lee | B01D 3/42 203/1 |
| 2016/0229714 A1* | 8/2016 | Thiel | B01D 5/006 |
| 2017/0334737 A1* | 11/2017 | Govindan | C02F 5/08 |
| 2018/0161694 A1* | 6/2018 | Lee | B01D 1/2896 |
| 2018/0298457 A1* | 10/2018 | Ridenour | A23L 33/11 |
| 2018/0299194 A1* | 10/2018 | Baxter | B01D 5/003 |
| 2019/0060778 A1* | 2/2019 | Chang | B01D 1/0011 |
| 2019/0329152 A1* | 10/2019 | Govindan | B01D 5/006 |
| 2023/0191276 A1* | 6/2023 | Thomson | C02F 1/12 159/48.2 |

OTHER PUBLICATIONS

International Preliminary Report on Patentability for Related Application No. PCT/AU2021/050462 dated Jul. 1, 2022 (19 pages).

* cited by examiner

APPARATUS AND METHOD FOR CONCENTRATING A FLUID

FIELD OF INVENTION

The present invention relates to an apparatus and a method of concentrating a process fluid, for example sugar cane juice or waste water.

The present invention relates particularly, although by no means exclusively, to an apparatus and a method of concentrating a process fluid that minimises process down time.

The present invention relates particularly, although by no means exclusively, to an apparatus and a method of concentrating a process fluid that minimises build up of fouling.

BACKGROUND OF THE INVENTION

In the sugar industry, sugar is typically produced by extracting and concentrating sugar cane juice before the concentrated juice is crystallized to form sugar.

The typical process involves crushing sugar cane to obtain sugar cane juice which is heated at high temperature to concentrate the juice. One problem with this process is that the heating step causes browning of the juice caused for example by the degradation of the polysaccharides into simple sugars, or caramelization. To address this problem, lime (CaO) is added to clarify and whiten the final product.

Another problem faced by operators of sugar refineries is that process equipment is prone to fouling due to the precipitation/deposition of sugar and impurities from the sugar cane juice on the process equipment. Examples of impurities include organic impurities such as proteins and inorganic impurities such as calcium- and silicon-containing minerals. Consequently, the process has to be periodically stopped to manually clean the process equipment to maintain the quality and output of the final product.

Attempts to avoid browning of the sugar cane juice include performing the evaporation at a lower temperature. However, this extends the processing time due to the reduced rate of evaporation and still requires periodic interruption of the process to allow manual cleaning of the process equipment.

It would be desirable to provide a process for concentrating process fluids, such as sugar cane juice, which reduces process down time.

SUMMARY OF THE INVENTION

The present invention provides an improved process and apparatus for concentrating a process fluid.

The present invention seeks to achieve this at least in part by operating under optimal conditions that concentrate the process fluid while reducing fouling of the process equipment. This may involve controlling the temperature of the process fluid.

The present invention may proactively mitigate the build-up of fouling by providing improved drift elimination in the mass transfer medium (e.g. air) line and/or evaporation-fill-less evaporation of the carrier fluid (e.g. water) in the process fluid.

The present invention also incorporates an automated cleaning system that allows cleaning of the liquid line including at least one heat exchanger. The automated cleaning system also allows the present invention to handle process fluids that contain substances that cause fouling or to avoid manual cleaning of the process equipment.

In this specification, mass transfer medium refers to a fluid, typically air, which facilitates mass transfer of a carrier fluid (e.g. water) from a process fluid stream into the mass transfer medium. Heat transfer may occur during this process.

In this specification, heat transfer medium refers to a fluid, for example water, which receives heat from or transfers heat to a process fluid.

The cleaning system may include one or more storage tanks which store anti-fouling reagents, valves and pumps that circulate the anti-fouling reagents through the apparatus in accordance with a cleaning protocol to de-foul the process equipment.

The cleaning protocol may be initiated when predetermined process variables deviate from their threshold ranges.

The cleaning protocol may be initiated when threshold ranges of predetermined process variables are exceeded.

The cleaning protocol can be run on a regular timed cycle or when a build-up of sludge/scale is detected.

The apparatus may include a controller in electrical communication with a plurality of sensors which monitor process variables at various parts of the process. Suitably, the controller is a Programmable Logic Controller.

The apparatus may include one or more of pressure, flowrate, temperature, humidity and level sensors.

The apparatus may include pressure and flowrate sensors to detect fouling, for example in the process fluid, water and air lines connected to an evaporator or heat exchanger(s) of the apparatus. When the sensors detect the pressure or flowrate deviating from a predetermined threshold value/range, a controller initiates a cleaning protocol to de-foul the apparatus.

Whilst the present invention is particularly suitable for processing sugar cane juice, the present invention is equally suitable for other applications including processing waste water and producing distilled water as process byproduct. Accordingly, whilst the present specification focuses primarily on the application of the invention to processing sugar cane, it is to be understood that the invention is not limited to that application.

The present invention is also suitable for performing zero-liquid discharge of various process fluids, for example wastewater from drying ponds, and in-process fluid streams.

The cleaning system of the present invention is equally applicable to energy-saving configurations which may comprise pre-cooling/energy recovery heat exchangers in any one of more of the process fluid, air and water-lines which only affect the energy efficiency of the process, and not the anti-fouling qualities.

The present invention provides a method of concentrating a process fluid, including a carrier fluid, including:
 (a) maintaining a process fluid at a predetermined temperature value/range;
 (b) evaporating the carrier fluid from the process fluid to produce a concentrated process fluid;
 (c) monitoring at least one process variable of steps (a) or (b) to detect fouling formed in either step (a) or (b); and
 (d) initiating a cleaning protocol if the process variable deviates from a predetermined value/range to reduce the fouling formed.

The process fluid encompasses homogeneous solutions and heterogenous mixtures obtained from a process (e.g. sugar solution from crushing of sugar cane or an effluent waste stream from a sugar refinery).

The carrier fluid may be a solvent that can dissolve a solute, or the liquid medium of a suspension or slurry. Suitably, the carrier fluid is water.

Step (a) may include feeding a process fluid into a heat exchanger to maintain the process fluid at a predetermined temperature value/range.

The process variable may be one or more of temperature, pressure, flow rate, humidity and fluid level. Suitably, the process variables are pressure drop across process equipment, and mass transfer medium and process fluid flow rates.

Step (b) may include feeding the process fluid from a heat exchanger to an evaporator. The evaporator enables at least some of the carrier fluid to be evaporated.

Step (b) may involve heating the carrier fluid without using an external heating source. This means that the process fluid may be heated using heat generated by the process (such as by using a heat exchanger) but does not involve the use of an external heater.

Step (b) may include condensing the evaporated carrier fluid.

Step (c) may include monitoring pressure difference across a heat exchanger.

Step (c) may include monitoring fluid flow rates of an evaporator. Suitably, step (c) includes monitoring mass transfer medium and/or process fluid flow rates through the evaporator.

Step (b) may involve direct contact of the process fluid with the mass transfer medium.

The mass transfer medium may be a gas. Suitably, the mass transfer medium is air.

When the mass transfer medium is a gas, the method may include bubbling the gas through water to humidify the gas entering the evaporator.

When the mass transfer medium is a gas, the method may include spraying the process fluid onto evaporation fill material.

Step (d) may include initiating the cleaning protocol if the pressure or flow rate deviates from a predetermined value/range to reduce fouling in a heat exchanger or evaporator.

Suitably, evaporation occurs at a temperature that does not result in degradation of the process fluid or an increase in fouling of the process equipment. For example, when processing sugar cane juice, evaporation is performed at a temperature ranging from 20-40° C. which was determined to avoid browning of the sugar cane juice and minimise deposition of sugar onto process equipment. In other embodiments, evaporation occurs under ambient environmental conditions.

The process fluid may be in-process liquids such as sugar cane extract or wastewater.

The process fluid may be maintained at a temperature not exceeding 40° C. using a heat exchanger. This ensures that the process fluid is at a temperature that does not cause excessive fouling or degradation of the process fluid when it is concentrated in an evaporator. For example, if the process fluid is a sugar solution, the temperature is maintained at a maximum of 20-40° C. to ensure that the polysaccharides in solution do not degrade into di- or monosaccharides, or to minimise caramelisation from occurring.

The process fluid may be maintained at the predetermined temperature value/range via counter current heat exchange.

The present invention also provides a method of producing a sugar concentrate from sugar cane, including:
  (a) obtaining a sugar-containing extract from sugar cane;
  (b) maintaining the extract at a predetermined temperature value/range;
  (c) clarifying the extract in the absence of added lime;
  (d) evaporating water from the extract to form a sugar concentrate;
  (e) monitoring a process variable of step (b) or (d) to detect fouling formed in either step (b) or (d); and
  (f) initiating a cleaning protocol if the process variable deviates from a predetermined value/range to reduce the fouling formed.

Step (a) may involve crushing sugar cane to obtain the sugar-containing extract (i.e. sugar cane juice). Suitably, the sugar-containing extract is formed by mixing the crushed sugar cane with water.

Step (b) may include feeding the extract into a heat exchanger to maintain the extract at a predetermined temperature value/range.

Step (d) may include feeding the extract from a heat exchanger to an evaporator.

Step (d) may include condensing the evaporated water.

Step (e) may include monitoring pressure difference across a heat exchanger, and mass transfer medium and/or process fluid flow rates through an evaporator.

Step (f) may include initiating a cleaning protocol if the pressure or flow rate deviates from a predetermined value/range to reduce fouling in the heat exchanger or evaporator.

The evaporation step may involve spraying the process fluid onto evaporation fill material and directing an air stream through the evaporation fill material in the opposite direction. One disadvantage of this method is that the fill material is prone to fouling and is difficult to clean.

An alternative evaporation step may involve bubbling the mass transfer medium through water, suitably using a bubble plate, to humidify the mass transfer medium before directing the humidified mass transfer medium into an air stream. One advantage of this method is a reduction in fouling and ease in maintaining the bubble plate, for example by using a wire brush. However, this method reduces process efficiency compared to the process involving use of evaporation fill material, typically about a 20% decrease in efficiency. This method may also increase pump, suitably fan, pressure head.

The method may include recycling part of the effluent mass transfer medium (e.g. air) from an evaporator. Suitably, the method includes circulating the effluent mass transfer medium into a drift chamber to remove entrained process fluid before returning the mass transfer medium to the evaporator.

The method may include directing part of the mass transfer medium from an evaporator to a drift chamber to remove entrained process fluid (e.g. sugar-containing extract) prior to returning the cleaned mass transfer medium to the evaporator. This reduces fouling of the heat exchanger which may be an evaporator coil of a Heating, Ventilation, and Air Conditioning (HVAC) system.

The method may include circulating the cleaned mass transfer medium through the heat exchanger prior to returning to the evaporator.

The method may include using sensors to monitor the process variables across process equipment used in the method. Suitably, the method includes using sensors to monitor pressure difference across a heat exchanger and flow rate of the mass transfer medium and/or the process fluid (e.g. sugar cane extract) in an evaporator.

When the apparatus comprises a cooler having a condenser and an evaporator coil, the flow/pressure of the liquid side of the evaporator coil or the air side of the condenser may be monitored.

It was determined that fouling of the hot or cold side of the heat exchanger increases the pressure difference across the heat exchanger. As such, once the pressure difference exceeds a threshold limit, the controller or a manual operator initiates the cleaning protocol.

The method may include a step of humidifying the mass transfer medium prior to contacting the process fluid. Utilising humidified air enhances the ability of the method to reduce fouling.

The step of humidifying the mass transfer medium may involve bubbling the mass transfer medium through water, suitably using a bubble plate.

The relative humidity of the mass transfer medium may range from 90-100%. Suitably, the relative humidity of the mass transfer medium ranges from 95-100%.

The method may include monitoring a process variable for deviation outside a predetermined value/range. Suitably, the method includes monitoring the pressure difference across the heat exchanger for deviation outside a predetermined range. For example, the method may determine scale/fouling build up in the heat exchanger by measuring the normal pressure differential (PD) across the heat exchanger (e.g. 35 kPa) @ a specific flow rate (e.g. 15 L/min, depending on the size of the heat exchanger) for a particular fluid (e.g. water) and monitoring for an increase in the PD (at the specific flow rate on the specific fluid).

The method may include stopping flow of process fluid into an evaporator before initiating the cleaning protocol. Suitably, the method may include re-directing the process fluid into a storage tank before initiating the cleaning protocol. This ensures that the anti-fouling reagents do not mix with and contaminate the process fluid.

The cleaning protocol can trigger a longer self-clean and/or the release of anti-fouling reagents with stronger cleaning properties (e.g. warmer water, more concentrated acid or basic solution).

For a 250 L/day laboratory unit, the predetermined pressure value/range of the heat exchanger may range from 5-50 kPa, preferably ranging from 10-45 kPa, more preferably 45 kPa. Suitably, the predetermined pressure value/range may be linearly scalable depending on the capacity of the apparatus. The predetermined pressure value/range may be dependent on the heat exchange method.

For a 250 L/day laboratory unit, the predetermined value/range of the mass transfer medium flowrate of the evaporator may range from 10-20 L/min, preferably 15 L/min. It was determined that fouling of the evaporator would reduce the mass transfer medium across the evaporator. As such, once the flowrate is reduced below a threshold limit, the controller initiates the cleaning protocol. Suitably, the threshold limit may be a drop of at least 0.5 litres/min. The predetermined value/range of the mass transfer medium flowrate of the evaporator may be linearly scalable depending on the capacity of the apparatus.

The predetermined value/range of the process fluid flowrate of the evaporator may range from 0.10-0.30 L/min, preferably 0.15-0.25 litres/min.

The cleaning protocol may include circulating anti-fouling solution through one or more process equipment used in the method. Suitably, the cleaning protocol includes circulating anti-fouling solution through the heat exchanger until the pressure returns to the predetermined value/range.

The anti-fouling solution may be water, an acidic or a basic solution. Preferably, the solution is of food grade quality.

Where the anti-fouling solution is water, it may be maintained at a temperature ranging from 20-40° C. Suitably, the water is maintained at a temperature ranging from 30-40° C. More suitably, the water is maintained at a temperature of about 35° C.

Where the anti-fouling solution is a basic solution, it may have a pH ranging from 8-10. Suitably, the basic solution is a hydroxide solution, such as a sodium hydroxide solution. More suitably, the basic solution has a concentration ranging from 10-20% (0.25-1 M).

Where the anti-fouling solution is an acidic solution, it may have a pH ranging from 4-6. Suitably, the acidic solution may comprise an edible acid including acetic acid, citric acid or malic acid. More suitably, the acidic solution has a concentration ranging from 5-20% (0.25-1 M).

The cleaning protocol may include activating a valve to release anti-fouling reagent from a storage tank into a heat exchanger or evaporator.

The cleaning protocol may include subjecting fluid conduits of a heat exchanger or evaporator to ultrasonication.

The cleaning protocol may include performing a rinse cycle to purge the anti-fouling reagent before terminating the cleaning protocol. The rinse cycle would purge anti-fouling reagent or waste material.

The method may include releasing process fluid from the storage tank after the rinse cycle.

The present invention further provides an apparatus for concentrating a process fluid, including a carrier fluid, comprising:
  a heat exchanger to maintain the process fluid at a predetermined temperature value/range;
  an evaporator in fluid communication with the heat exchanger to receive the process fluid and evaporate the carrier fluid from the process fluid to produce a concentrate;
  at least one sensor for monitoring a process variable across the heat exchanger or the evaporator to detect fouling of the heat exchanger or the evaporator;
  a cleaning system to reduce fouling in the apparatus; and
  a controller configured to receive signals from the sensor or a manual user input to initiate the cleaning system if the process variable deviates from a predetermined value/range.

The apparatus may include a condenser to condense the evaporated carrier fluid. Suitably, the condenser may be in fluid communication with the heat exchanger.

The apparatus may include a conduit for recycling part of the evaporated carrier fluid as the fluid for humidifying the mass transfer fluid.

The apparatus may include one or more pressure sensors to monitor pressure difference across the heat exchanger.

The apparatus may include a flow rate sensor to monitor mass transfer medium flow rate through the evaporator.

The apparatus may include a flow rate sensor to monitor process fluid flow rate through the evaporator.

The flowrate sensor may be a paddle flow or ultrasonic flow sensor.

The cleaning system may comprise one or more storage tanks containing anti-fouling reagent.

The controller may have a manual override to allow the cleaning protocol to be initiated manually.

The controller may be configured to receive signals from the pressure and/or flowrate sensor to initiate a cleaning protocol of the cleaning system.

The heat exchanger may be a HVAC system. Suitably, the heat exchanger is an evaporator coil of a HVAC system.

The heat exchanger may be a cooler. Suitably, the heat exchanger is a cooler condenser.

The heat exchanger may be a counter-current heat exchanger.

The apparatus may include at least two heat exchangers. Suitably, the heat exchangers are a cooler condenser and an evaporator coil.

The evaporator may be configured to directly contact the heat transfer medium with the process fluid.

The apparatus may include a recycle loop to recirculate part of mass transfer medium from the evaporator.

The apparatus may include a drift chamber to receive at least part of the mass transfer medium from the evaporator to remove entrained process fluid to form a cleaned mass transfer medium stream which is returned to the evaporator, suitably via a condenser.

The drift chamber may include an eliminator to capture the entrained process fluid. This reduces fouling of the heat exchanger.

The drift chamber may include a plurality of run-off outlets to return the captured process fluid to the evaporator or a storage tank.

The eliminator may comprise a tortuous (e.g. zig-zag) pathway to enhance capture of the entrained process fluid.

The drift chamber may be configured such that the cleaned mass transfer medium is in thermal communication with the process fluid.

The evaporator may be a spray tower. The spray tower may be configured to spray process fluid into a stream of mass transfer medium. Suitably, the spray tower includes a spray nozzle to spray process fluid into a stream of mass transfer medium.

The evaporator may include a bubble plate to facilitate humidification of the mass transfer medium prior to contacting the process fluid. Preferably, the plate is made from stainless steel. More preferably, the plate includes a plurality of 1 mm holes.

The evaporator may include evaporation fill material.

The apparatus may include at least one storage tank for containing anti-fouling reagent.

The cleaning system may include a water storage tank, an acid solution storage tank and/or a basic solution storage tank. Depending on the nature of the fouling material, the cleaning system may circulate one of these solutions through the heat exchanger and/or evaporator.

The apparatus may include a feed tank for holding the process fluid before entering the heat exchanger.

The apparatus may include one or more interim sampling tanks for receiving process fluid when the cleaning protocol is initiated.

The apparatus may include an ultrasonicator to clean the heat exchanger and/or evaporator. Suitably, an ultrasonicator is attached to a conduit leading into the heat exchanger to transmit mechanical vibration through the conduit into fluid.

BRIEF DESCRIPTION OF DRAWINGS

An embodiment of the invention is hereinafter described by way of example only with reference to the accompanying drawings, wherein.

DETAILED DESCRIPTION

Figure 1:
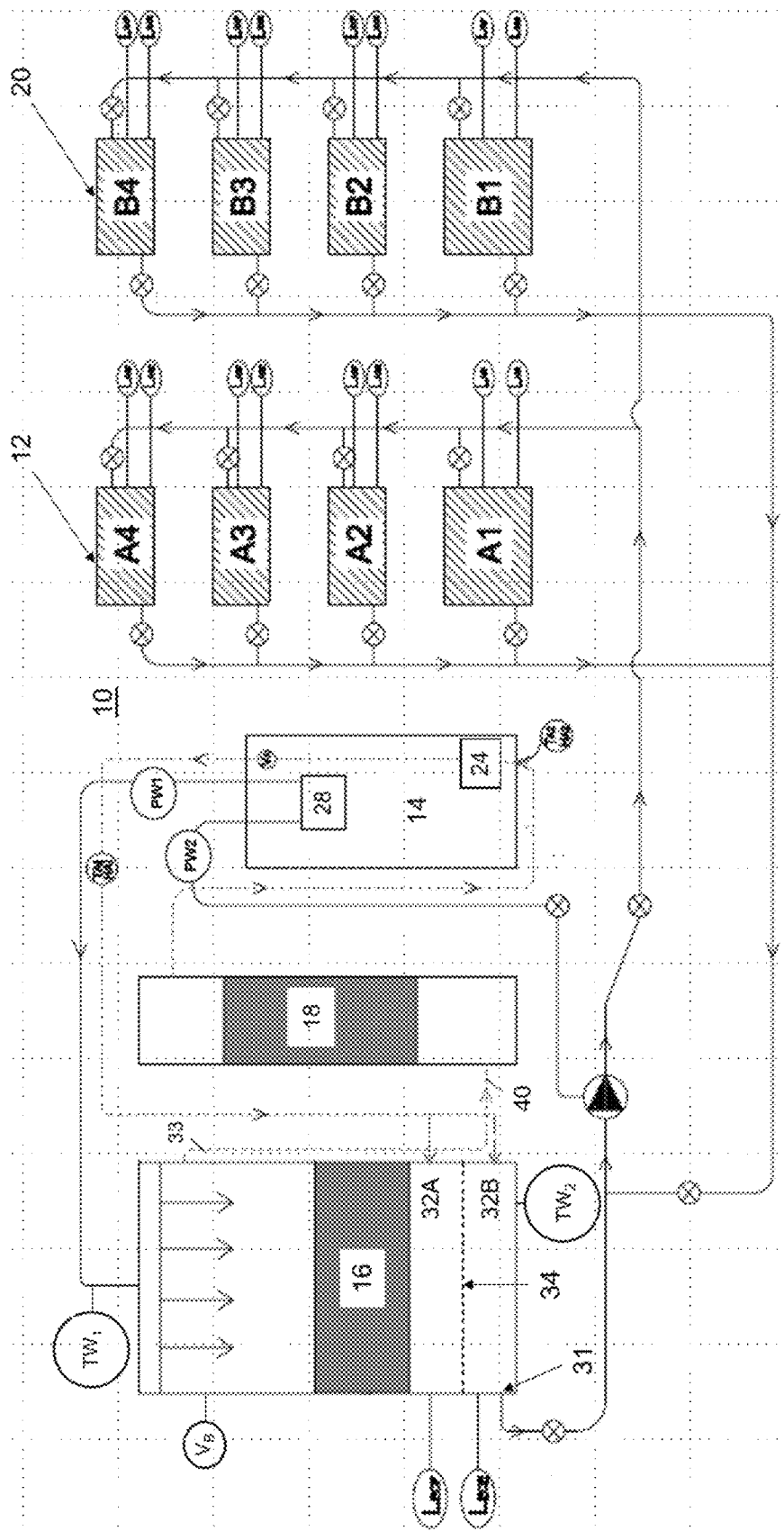
FIG. 1 is a flow diagram of the apparatus according to one form of the present invention.
Figure 2:
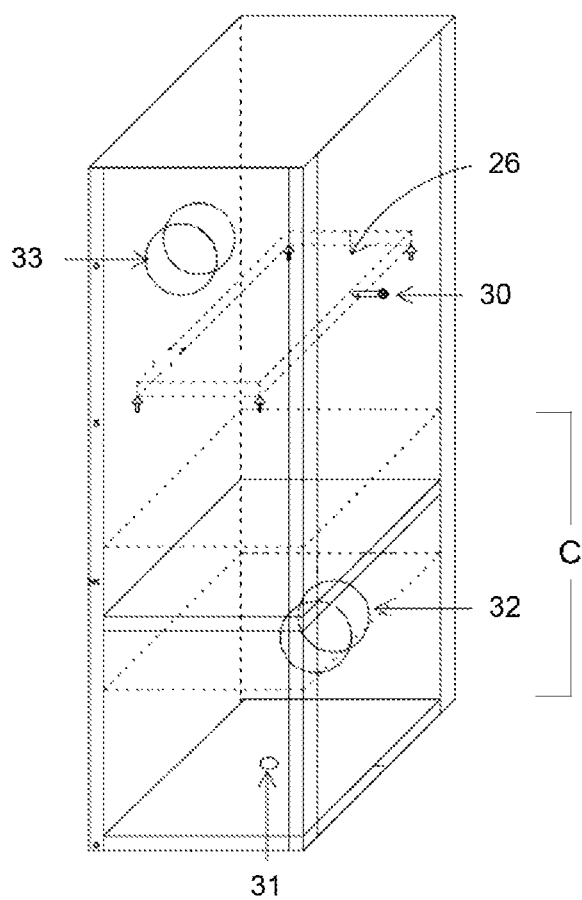
FIG. 2 illustrates a spray tower of the apparatus of FIG. 1.

An apparatus for concentrating a process fluid as defined by the invention is marked as 10 in FIG. 1.

In this example, the apparatus is configured to process sugar cane extract (juice). However, it can be appreciated that the apparatus may be configured to process other process fluids including industrial process fluids such as wastewater.

The apparatus 10 comprises a cooler 14 including heat exchangers in the form of a condenser 24 and water-cooled evaporator coil 28, an evaporator in the form of spray tower 16, a drift chamber 18, a cleaning system comprising a first storage tank tower comprising a feed tank 12A1, concentrate storage tank 12A2, miscellaneous output interim sampling tanks 12A3 and 12A4, and a second storage tank tower comprising anti-fouling reagent tanks 20B1-B4 for storing separate anti-fouling reagents.

A control system comprising a controller, and a plurality of sensors including pressure and flowrate sensors monitoring process variables at various locations of the apparatus initiates the cleaning system if the process variables deviate from predetermined threshold limits.

Extract from crushed sugar cane is stored in feed tank 12A1 which is in fluid communication with cooler 14.

The cooler 14 includes a water-cooled evaporator coil 28 to maintain the extract at a temperature ranging from 20-40° C. before it is fed into spray tower 16. The cooler 14 also includes a condenser 24 on the cold side of the cooler to condense water out of the air stream exiting the drift chamber.

Figure 3:
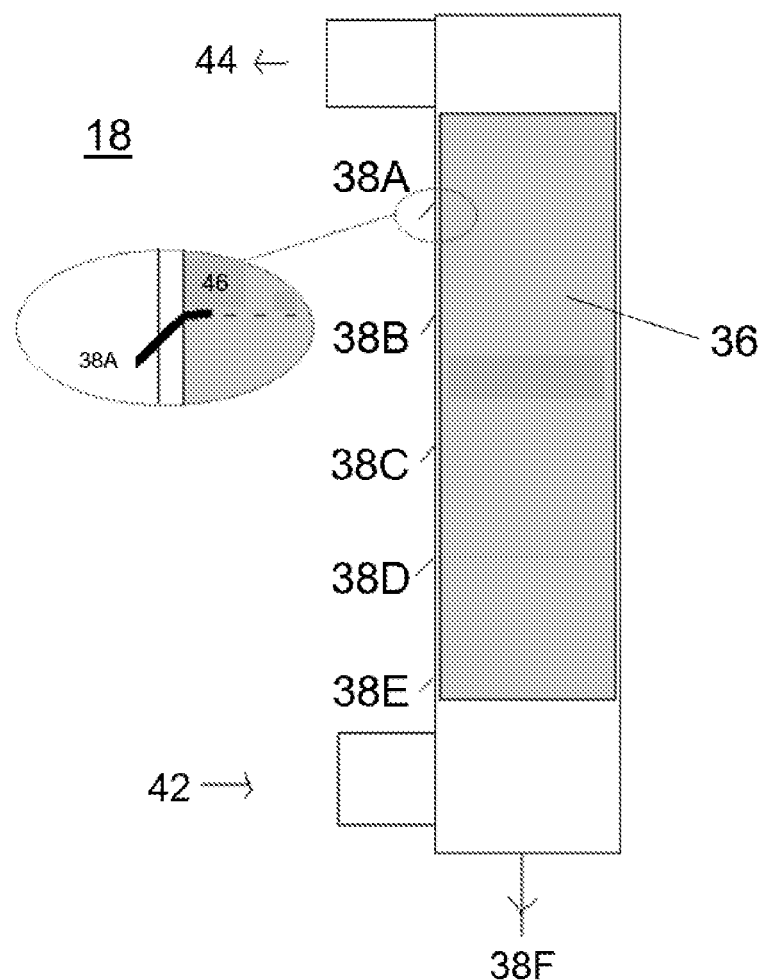
FIG. 3 illustrates a drift chamber of the apparatus of FIG. 1.

The feed tank 12A1 may be temperature controlled to maintain the extract at the same predetermined temperature range. It was determined that keeping the extract at this temperature range prevents (or at least minimizes) browning of the heat-sensitive extract (e.g. 60% sucrose solution). This avoids the need to use lime to whiten the final product which is an undesirable additive because it contributes to the fouling of the process equipment, particularly spray tower 16, the liquid side of the cooler condenser 24 and the air side of the water-cooled evaporator coil 28.

The spray tower 16 is located downstream of the cooler 14. The top of the spray tower includes a spray nozzle 26 including a process fluid inlet 30 to receive and spray the extract into the spray tower chamber. The bottom of the spray tower 16 includes a mass transfer medium inlet 32A/B to supply air upwards to meet the downward travelling extract (see FIG. 2). The counter current fluid flow arrangement optimises the mass transfer of water from the extract into the air stream to concentrate the extract.

Mass transfer medium inlet 32A is used when the evaporation step utilises evaporation fill material and mass transfer medium inlet 32B is used when the evaporation step involves bubbling mass transfer medium through water.

When evaporation fill material is used, it occupies region C of the spray tower in FIG. 2.

Water from the sugar cane extract is removed into the air stream to concentrate the extract which can be sent for further processing to produce sugar or to concentrate storage tank 12A2 for storage.

The spray tower 16 may include a bubble plate 34 to humidify the air being fed into the spray tower (see FIG. 1). In this example, the air is bubbled through water via the bubble plate to humidify the air.

A drift chamber 18 is positioned between the cooler 14 and spray tower 16 to receive at least part of the exiting air stream from the spray tower.

The drift chamber includes an eliminator 36 to capture entrained non-vaporised sugar cane extract droplets from the exiting air stream. This is done by having the eliminator 36 direct the air stream through a tortuous (e.g. zig-zag) pathway. The collected run-off is returned to the spray tower 16 via run-off outlets 38A-F. Run-off outlets 38A-E includes a horizontal fin 46 which directs run-off from the drift chamber (see FIG. 3).

The cleaned air stream is then directed to the cooler 14 to reduce the temperature of the stream before it is returned to the spray tower. The cleaned air may be used as a heat transfer medium to cool the process fluid in the cooler 14.

Having the drift chamber capture sugar cane extract droplets from the air stream minimizes fouling of the cooler condenser 24, particularly choking of the cooler air fins by sugar deposits from the entrained process fluid.

The apparatus 10 also includes a control system comprising a Programmable Logic Controller (PLC) and a plurality of sensors positioned at various locations on the apparatus to monitor process variables including pressure, humidity, temperature, fluid level and flow rate.

The controller receives signals from the sensors and initiates a cleaning protocol if the pressure or flow rate deviates from a predetermined value/range. In one example, the predetermined thresholds are a pressure difference of 10 kPa across the cooler, an air flow rate of 15 L/min through the spray tower and a process fluid flow rate of 0.25 L/min through the spray tower.

The PLC controls processing of the process fluid, monitoring of process variables, and initiating the cleaning system. The controller measures any build up of fouling by detecting increases in air or water pressure across the process equipment or decreases in process fluid, air or water flow rates.

The cleaning protocol directs the cleaning system to run humidified air or anti-fouling reagents through the apparatus to remove the fouling. This protocol can be configured to run at regular intervals independent of the signals from the sensors.

Pressure sensors PW1 and PW2, flowrate sensors VA and VB, fluid level sensors Lx (where x refers to the fluid stream being monitored), humidity sensors HA1 and HA2, and temperature sensors TW1, TW2, TA1 and TA2 monitor various parts of the system and send signals to the PLC which initiates the cleaning protocol when selected process variable measurements deviate from a predetermined threshold range.

Sensors of particular importance are pressure sensors PW1 and PW2 and flowrate sensors VA and VB.

The pressure sensors are located at the various fluid inlets and outlets of the spray tower 16 and the cooler 14 to enable differential pressure values to be calculated. The flowrate sensors are located in the process fluid, water and air lines, respectively.

Pressure sensors PW1 and PW2 are positioned to monitor the pressure difference across the cooler 14. Specifically, the pressure sensors measure the pressure difference across the conduit supplying the sugar cane extract into the cooler 14. An increase in pressure would indicate a corresponding increase in fouling, for example comprising build up of sugar deposits.

Flowrate sensors VA and VB are positioned to monitor the air and sugar cane extract flow rates of the spray tower 16, respectively. A decrease in flow rate across the spray tower would indicate an increase in fouling which reduces the area available for fluid flow.

Second storage tank tower includes anti-fouling reagent tanks 20B1-B4. Tank 20B1 stores water (preferably maintained at 35° C.), tank 20B2 stores acetic acid solution, tank 20B3 stores sodium hydroxide and tank 20B4 stores cleaning solution (e.g. non-toxic soap solution).

One or more cleaning reagents are circulated through the cooler 14 and spray tower 16 when the cleaning protocol is triggered. The anti-fouling reagent tanks may be temperature controlled to maintain the solutions at an optimal temperature. For sugar refinement, the optimal temperature range for the cleaning reagents range from 20-40° C. Higher temperature can be used if the fouling is particularly stubborn.

The cleaning protocol may involve ultrasonication of the conduits of the cooler 14 and the spray tower 16.

The cleaning system allows residual fouling caused by the process fluid or any other substances, for example lime, to be removed from the apparatus quickly and efficiently.

The cleaning system also allows the apparatus to handle process fluids containing substances that cause fouling, such as lime-containing sugar cane solutions without the fouling adversely impacting on the efficiency of the apparatus, because of its ability to monitor, mitigate and remove build up of fouling.

First storage tank tower includes interim sampling tanks 12A3-A4 to receive the sugar cane extract when the cleaning protocol is initiated or when a sample of the process fluid is required.

In operation, sugar cane is crushed and mixed with water to form a sugar-containing extract. The extract is clarified in the absence of added lime and stored in feed tank 12A1 until it is ready to be processed.

The optimal operating conditions for this example are provided in the table below. These conditions apply to the process fluid feed spray nozzle inlet conditions (and feed outlet conditions) and the air in/out of the spray tower:

| Process variable | Value |
|---|---|
| Air pressure | ambient |
| Air temperature in | 20° C. |
| Relative Humidity in | 95-100% |
| Air temperature out | 30° C. |
| Relative Humidity out | 95-100% |
| Air flow rate | 250 L/s |
| Feed temperature in | 34° C. |
| Feed temperature out | 30° C. |
| Feed flow rate | 15 L/min |
| Feed water pressure | 140 kPa |

During processing, the extract is pumped into cooler 14 in the form of a HVAC system. The extract is cooled to a temperature about 3-5° C., preferably 4° C., when it passes through the evaporator coil 28. This temperature range is below the maximum temperature the feed can tolerate before degrading or browning the extract in the feed. Ideally, the extract is cooled to about 30° C.

Alternatively, the cooler 14 may be substituted with a heat exchanger having heating and cooling functionality. In this embodiment, if the extract entering the heat exchanger is at a lower temperature than the predetermined temperature, the heat exchanger heats the extract to the predetermined temperature.

The extract is then fed into the process fluid inlet 30 of the spray nozzle 26 located at the top of spray tower 16 and sprayed downward into a humidified air stream in the chamber of the spray tower 16. The humidified air stream is formed by bubbling a stream of air, entering the spray tower via mass transfer medium inlet 32A, through stainless steel bubble plate 34 having a plurality of 1 mm holes into a stream of water being pumped into the spray tower 16.

The extract and humidified air stream meet in countercurrent fashion which causes water from the extract to be removed into the air stream to concentrate the extract. For a 250 L/day laboratory unit, about 0.17 L/min of water is evaporated from the extract. The concentrated sugar solution exits spray tower process fluid outlet 31 and is either transferred to concentrate storage tank 12A2 or directed for further processing while the humidified air exits the spray tower via mass transfer medium outlet 33.

Part of the humidified air 40 can be cleaned and recycled back to the spray tower via cooler 14. The air steam 40 is directed to drift chamber inlet 42 and into eliminator 36. In the eliminator, entrained sugar solution removed from the humidified air stream is returned to the spray tower to be reprocessed while the cleaned air exits outlet 44 into the condenser 28 of cooler 14. The cleaned air may be used to cool the process fluid in the cooler before the cleaned air is returned to the spray tower for re-use as the mass transfer medium.

The drift eliminator is employed particularly to reduce fouling in condenser 24 when the air stream circulates the cooler 14.

In one example, the PLC initiates the cleaning protocol when the pressure across the cooler 14 increases above 10 kPa, the air flow rate across the spray tower 16 falls below 15 L/min or the process fluid flow rate across the spray tower 16 falls below 0.25 L/min.

Depending on the process variable which triggers the cleaning protocol, the PLC may take a number of steps to clean the relevant sections of the apparatus.

For example, if the trigger is the water flow rate, the PLC cleans the spray tower water line by controlling the valves of the apparatus to pump process fluid from the spray tower into one or both interim sampling tanks 12A3-A4 before releasing an appropriate anti-fouling reagent from its respective storage tank to circulate the spray tower to remove the fouling.

The anti-fouling reagent is circulated in the spray tower for 10 minutes or until the water flowrate returns within the threshold range. Once this requirement is met, the PLC deactivates the cleaning system and switches back to running process fluid through the apparatus. Preferably, a rinse cycle with water is performed to purge the anti-fouling reagent from the apparatus before the PLC switches back to process fluid.

If the trigger is the air flow rate, the PLC cleans the spray tower air line by controlling the valves in the apparatus to pump process fluid from the spray tower into interim sampling tanks 12A3-A4 before circulating air through the spray tower for 10 minutes or until the air flowrate returns within the threshold range. Once this requirement is met, the PLC deactivates the cleaning system and switches back to running process fluid through the apparatus. Preferably, a rinse cycle with water is performed before the PLC switches back to process fluid.

In another example, the cleaning protocol involves performing a rinse cycle (10 minutes of 22° C. rinsing water at 30 L/min (double cycle rate)) once per day. It was shown that the rinse cycle reduces fouling pressure buildup in cooler 14 from 66 kPa to 60 kPa with minimal disruption to operation (96.5% uptime).

To demonstrate the effectiveness of the cleaning system, in one example process of concentrating thin (dilute) sugar juice based on both commercial raw sugar or industrial inedible 'sugar cake', water was extracted from a 145 L 12% sucrose feed stream at a rate of 120 L/day to generate a 25 L 65% sucrose concentrate without causing any irreversible clogging of the apparatus 10. Good quality sugar concentrate and a water effluent stream were produced in the process. Over 30 day cycles were run which produced a small but significant amount of scale (a few mm thick within a 25 mm tube sufficient to cause a water flow drop from 18 down to 16 L/min). The cleaning protocol using one or more of water (at varying temperatures) and food grade acetic acid reversed the build-up to restore flow rate to 18 L/min (to zero mm of scale within measurement accuracy of flow rate).

In a further example, after a 3 day continuous evaporative process run 24 hours a day, the air pressure in the cooler increased from 60 to 66 psi. The cleaning protocol reversed the pressure build-up back to 60 psi after 5-10 minutes.

What is claimed is:

1. A method of concentrating a process fluid, including a carrier fluid, including:

(a) maintaining the process fluid at a predetermined temperature value/range;
(b) evaporating the carrier fluid from the process fluid in an evaporator to produce a concentrated process fluid and an effluent mass transfer medium;
(c) monitoring at least one process variable of steps (a) or (b) to detect fouling formed in either step (a) or (b);
(d) initiating a cleaning protocol if the process variable deviates from a predetermined value/range to reduce the fouling formed; and
(e) directing part of the effluent mass transfer medium into a drift chamber having a plurality of run-off outlets, the drift chamber located downstream of the evaporator to remove entrained process fluid from the mass transfer medium prior to returning the mass transfer medium to the evaporator.

2. The method according to claim 1, wherein step (a) includes feeding the process fluid into a heat exchanger to maintain the process fluid at a predetermined temperature value/range.

3. The method according to claim 1, wherein step (b) includes feeding the process fluid from a heat exchanger to the evaporator.

4. The method according to claim 1, wherein step (b) includes heating the carrier fluid without using an external heating source.

5. The method according to claim 1, wherein step (b) includes direct contact of the process fluid with the mass transfer medium.

6. The method according to claim 5, including a step of humidifying the mass transfer medium prior to contacting the process fluid.

7. The method according to claim 1, wherein step (b) includes spraying the process fluid onto an evaporation fill material and directing an air stream through the evaporation fill material in the opposite direction.

8. The method according to claim 1, wherein step (c) includes monitoring pressure difference across a heat exchanger.

9. The method according to claim 1, wherein step (c) includes monitoring fluid flow rates through the evaporator.

10. The method according to claim 8, wherein step (d) includes initiating the cleaning protocol if the pressure deviates from a predetermined value/range to reduce fouling in a heat exchanger or evaporator.

11. The method according to claim 1, including recycling part of the effluent mass transfer medium from the evaporator.

12. The method according to claim 1, wherein the cleaning protocol includes circulating an anti-fouling solution through one or more process equipment used in the method.

13. The method according to claim 1, wherein the cleaning protocol includes subjecting fluid conduits of a heat exchanger or evaporator to ultrasonication.

14. A method of producing a sugar concentrate from sugar cane, including:
   (a) obtaining a sugar-containing extract from sugar cane;
   (b) maintaining the extract at a predetermined temperature value/range;
   (c) clarifying the extract in the absence of added lime;
   (d) evaporating water from the extract in an evaporator to form a sugar concentrate and an exiting air stream;
   (e) monitoring a process variable of step (b) or (d) to detect fouling formed in either step (b) or (d);
   (f) initiating a cleaning protocol if the process variable deviates from a predetermined value/range to reduce the fouling formed; and
   (g) directing part of the exiting air stream into a drift chamber having a plurality of run-off outlets, the drift chamber located downstream of the evaporator to remove entrained non-vaporised sugar cane extract droplets from the air stream prior to returning the air stream to the evaporator.

15. The method according to claim 14, wherein the extract is maintained at a maximum temperature of 20-40° C.

16. An apparatus for concentrating a process fluid, including a carrier fluid, comprising:
   a heat exchanger to maintain the process fluid at a predetermined temperature value/range;
   an evaporator in fluid communication with the heat exchanger to receive the process fluid and evaporate the carrier fluid from the process fluid to produce a concentrate and an effluent mass transfer medium;
   at least one sensor for monitoring a process variable across the heat exchanger or the evaporator to detect fouling of the heat exchanger or the evaporator;
   a cleaning system to reduce fouling in the apparatus;
   a controller configured to receive signals from the sensor or a manual user input to initiate the cleaning system if the process variable deviates from a predetermined value/range; and
   a drift chamber having a plurality of run-off outlets, the drift chamber located downstream of the evaporator to remove at least part of the entrained process fluid from the mass transfer medium prior to returning the mass transfer medium to the evaporator.

17. The apparatus according to claim 16, including one or more pressure sensors to monitor pressure difference across the heat exchanger.

18. The apparatus according to claim 16, including a flow rate sensor to monitor a mass transfer medium flow rate or a process fluid flow rate through the evaporator.

19. The apparatus according to claim 16, wherein the evaporator includes a bubble plate to facilitate humidification of a mass transfer medium prior to contacting the process fluid.

20. The apparatus according to claim 16, including an ultrasonicator to clean the heat exchanger and/or evaporator.

* * * * *